(12) United States Patent
Park

(10) Patent No.: US 9,096,225 B2
(45) Date of Patent: Aug. 4, 2015

(54) CONTROL METHOD AND SYSTEM FOR LIMITING MAXIMUM SPEED OF ENGINE AND MOTOR OF HYBRID VEHICLE

(71) Applicants: Hyundai Motor Company, Seoul (KR); Kia Motors Corporation, Seoul (KR)

(72) Inventor: Tae Wook Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/095,488

(22) Filed: Dec. 3, 2013

(65) Prior Publication Data

US 2014/0163794 A1    Jun. 12, 2014

(30) Foreign Application Priority Data

Dec. 11, 2012    (KR) .................... 10-2012-0143872

(51) Int. Cl.
*B60W 20/00*    (2006.01)
*G06F 17/00*    (2006.01)

(52) U.S. Cl.
CPC ............. *B60W 20/40* (2013.01); *Y02T 10/6286* (2013.01); *Y10S 903/902* (2013.01)

(58) Field of Classification Search
CPC ........ B60W 20/00; B60W 20/40; B60K 1/02; G06F 19/00
USPC ............ 701/22, 67, 68; 318/268; 180/65.265
See application file for complete search history.

(56) References Cited

U.S. PATENT DOCUMENTS

| | | | |
|---|---|---|---|
| 7,203,578 B2* | 4/2007 | Kuang et al. ..................... | 701/22 |
| 2004/0164690 A1* | 8/2004 | Degner et al. ................. | 318/268 |
| 2009/0157245 A1* | 6/2009 | Moon et al. ..................... | 701/22 |
| 2013/0006456 A1* | 1/2013 | Thaduvayi et al. ............. | 701/22 |

FOREIGN PATENT DOCUMENTS

| | | |
|---|---|---|
| JP | 2010-111143 A | 5/2010 |
| JP | 2011-219025 A | 11/2011 |
| KR | 2008-0001817 A | 1/2008 |

* cited by examiner

*Primary Examiner* — Tan Q Nguyen
(74) *Attorney, Agent, or Firm* — McDermott Will & Emery LLP

(57) ABSTRACT

A control method and system for limiting a maximum speed of an engine and a motor of a hybrid vehicle that includes an engine clutch configured to control power transmission between the engine and the motor. The control method includes determining whether speed of the engine exceeds a predetermined maximum engine speed, determining whether speed of the motor exceeds a predetermined maximum motor speed, limiting the speed of the engine based on a predetermined engine torque profile when the speed of the engine exceeds the predetermined maximum engine speed, and limiting the speed of the motor based on a predetermined motor torque profile when the speed of the engine exceeds the predetermined maximum engine speed.

9 Claims, 6 Drawing Sheets

CONTROL METHOD AND SYSTEM FOR LIMITING MAXIMUM SPEED OF ENGINE AND MOTOR OF HYBRID VEHICLE

CROSS-REFERENCE TO RELATED APPLICATION

This application claims the benefit of priority to Korean Patent Application No. 10-2012-0143872 filed in the Korean Intellectual Property Office on Dec. 11, 2012, the entire contents of which are incorporated herein by reference.

TECHNICAL FIELD

The present disclosure relates to a control method and system for limiting the maximum speed of an engine and a motor of a hybrid vehicle.

BACKGROUND

Hybrid vehicles operate by power from an internal combustion engine and power from a motor through a battery. In particular, hybrid vehicles are designed to efficiently combine and use the power from the internal combustion engine and the motor.

For example, as illustrated in FIG. 1, a hybrid vehicle includes: an engine 10; a motor 20; an engine clutch 30 which controls power transmission between the engine 10 and the motor 20; a transmission 40; a differential gear 50; a battery 60; an integrated starter-generator (ISG) 70 which starts the engine 10 or generates electric power by output of the engine 10; and wheels 80.

As further shown, the hybrid vehicle includes: a hybrid control unit (HCU) 200 which controls overall operation of the hybrid vehicle; an engine control unit (ECU) 110 which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

The battery control unit 160 may also be referred to as a battery management system (BMS), and the integrated starter-generator 70 may also be referred to as a starting/generating motor or a hybrid starter & generator.

The hybrid vehicle may operate in an electric vehicle (EV) mode using only power of the motor 20, a hybrid electric vehicle (HEV) mode using torque of the engine 10 as main power and torque of the motor 20 as auxiliary power, or a regenerative braking (RB) mode during braking or when the vehicle runs by inertia. In the RB mode, braking and inertia energy are collected through power generation of the motor 20, and the battery 60 is charged with collected energy.

Since the hybrid vehicle uses both an engine and a motor, the hybrid vehicle needs to perform different control of limiting maximum speed (e.g., 6500 rpm) from a vehicle using only an internal combustion engine as a main power source.

Controlling the maximum speed limit is performed to protect a power source and a system of a vehicle when a vehicle's maximum output is required.

The vehicle using the internal combustion engine as the only power source may control processes of the maximum speed limit as follows.

E_1: An engine control unit (ECU) controls an engine to output a torque corresponding to an engine speed according to the output characteristic of the engine.

E_2: Since the engine speed is equal to speed of an input shaft of a transmission, a transmission control unit (TCU) performs shift-speed control so that the engine speed may not exceed the maximum speed.

E_3: When the engine speed reaches the maximum speed due to shift-changing delay at process E_2, the ECU limits output of the engine to 0 torque by performing fuel-cut control.

Hybrid vehicles generally run in the HEV mode since the maximum power of the engine and the motor is required in a high rpm range for the hybrid vehicles when high power is requested.

In the HEV mode, the engine clutch of the hybrid vehicle is in a lock-up state in order to transmit engine torque to a driving shaft. In the lock-up state of the engine clutch, the speed of the engine is synchronized with the speed of the motor.

As described above, since the hybrid vehicle uses two power sources, the internal combustion engine and the motor by a battery, controlling a maximum speed limit of the hybrid vehicle should further comprise a function to limit maximum speed related to the motor, unlike the vehicle using solely an internal combustion engine as the main power source.

General control processes for the limiting maximum speed of the hybrid vehicle may be described as follows.

H_1: The HCU controls the engine and the motor with the ECU and the MCU so that the engine torque and motor torque corresponding to the engine speed and motor speed may be outputted according to an output characteristic map of the engine and an output characteristic map of the motor.

H_2: The TCU performs shift-speed control so that the engine speed and the motor speed may exceed the maximum speed, respectively.

H_3: When the engine speed and the motor speed reach the maximum speed due to shift-changing delay at process H_2, the HCU limits output from the engine and the motor so that each of the engine and the motor may output 0 torque by feedback control based on a map table.

H_4: As shown in FIG. 2, when the engine speed and the motor speed increase despite performing process H_3, each of the ECU and the MCU controls a limiting of output to 0 torque by itself.

However, as described above, since the control method of limiting the maximum speed of the engine and motor of the hybrid vehicle performs feedback control based on the map table, problems may occur as follows.

FIG. 3 is an exemplary graph for explaining problems of a control method of limiting the maximum speed of an engine and motor of a hybrid vehicle according to the related art.

Referring to FIG. 3, since the control method of limiting the maximum speed of the engine and motor of the hybrid vehicle according to the related art sets maximum output torque according to a 2-dimentional map table based on speed of the engine and motor, torque variation may badly occur.

That is, the control method of limiting the maximum speed of the engine and motor of the hybrid vehicle according to the related art may cause problems as follows.

First, since output torque is limited according to the speed of the engine and motor, a value of limiting output torque of the engine and motor may be badly varied while input speed of the transmission is varied. For example, referring to FIG. 3, when input speed of the transmission is varied from 6000 rpm to 6200 rpm, output torque may be varied to maximum of 500 N·m (=200 N·m+300 N·m). In this case, a judder or shock may occur in the hybrid vehicle.

Second, it may be difficult to keep the input speed of the transmission at a speed value for limiting the maximum speed of the engine or motor. That is, when the maximum speed of the engine or motor is limited to 6200 rpm, input speed of the transmission may exceed 6200 rpm. In this case, protecting the transmission hardware system and the electrical-power-device hardware system may be difficult.

Third, when the engine clutch is in a lock-up state, maintaining a consistent limiting maximum torque value of the engine and the motor is difficult due to speed difference between the engine and the motor. For example, when the engine is in a fuel-cut state due to a maximum torque limit, because the motor generates additional torque in order to satisfy demand torque, a state of charge (SOC) of the battery may deteriorate.

Fourth, a shift shock and shift delay may occur because of a bad variation of input torque of the transmission.

The above information disclosed in this section is only for enhancement of understanding of the background of the invention and therefore it may contain information that does not form the prior art that is already known in this country to a person of ordinary skill in the art.

SUMMARY

The present disclosure provides a control method and a system that limit the maximum speed of an engine and a motor of a hybrid vehicle by feed-forwardly controlling the engine and the motor based on a concept of a torque profile irrespective of speed and torque of an engine and a motor.

An exemplary embodiment of the present inventive concept provides a control method of limiting the maximum speed of an engine and a motor of a hybrid vehicle, wherein the hybrid vehicle includes an engine clutch configured to control power transmission between the engine and the motor, and the transmission connected to the motor, the control method including: determining whether the speed of the engine exceeds a predetermined maximum engine speed; determining whether speed of the motor exceeds a predetermined maximum motor speed; limiting the speed of the engine based on a predetermined engine torque profile when the speed of the engine exceeds the predetermined maximum engine speed; and limiting the speed of the motor based on a predetermined motor torque profile when the speed of the engine exceeds the predetermined maximum engine speed.

Limiting the speed of the engine may include: controlling the engine based on the predetermined engine torque profile to converge torque of the engine to 0 (zero) when the speed of the engine exceeds the predetermined maximum engine speed; determining whether the speed of the engine is under a predetermined releasing engine speed while the torque of the engine converges to 0; and increasing the torque of the engine when the speed of the engine is under the predetermined releasing engine speed.

The increasing the torque of the engine may increase the torque of the engine to torque corresponding to a point in time when the speed of the engine exceeds the predetermined maximum engine speed based on the predetermined engine torque profile.

The predetermined maximum engine speed may be equal to the predetermined maximum motor speed.

Limiting the speed of the motor may include: controlling the motor based on the predetermined motor torque profile to converge torque of the motor to 0 (zero) when the speed of the motor exceeds the predetermined maximum motor speed; determining whether the speed of the motor is under a predetermined releasing motor speed while the torque of the motor converges to 0; and increasing the torque of the motor when the speed of the motor is under the predetermined releasing motor speed.

Increasing the torque of the motor may include increasing the torque of the motor to torque corresponding to a point in time when the speed of the motor exceeds the predetermined maximum motor speed based on the predetermined motor torque profile.

The predetermined releasing engine speed may be different from the predetermined releasing motor speed.

Increasing the torque of the motor may be performed after increasing the torque of the engine.

Controlling the engine based on the predetermined engine torque profile may include feed-forwardly controlling the engine based on the predetermined engine torque profile.

The engine and the motor may be feed-forwardly controlled based on the predetermined engine torque profile and the predetermined motor torque profile, respectively.

Another embodiment of the present inventive concept provides a control system for limiting maximum speed of an engine and a motor of a hybrid vehicle, including: an engine clutch configured to control power transmission between an engine and a motor; a transmission configured to be connected to the motor; an engine control unit configured to control operation of the engine; a motor control unit configured to control operation of the motor; and a maximum speed limit controller configured to control a maximum speed limit of the engine and the motor, wherein the maximum speed limit controller operates by a program that is set to perform the control method of limiting the maximum speed of an engine and a motor of a hybrid vehicle according to an exemplary embodiment of the present inventive concept.

The maximum speed limit controller may include: a maximum engine speed limit controller configured to control the maximum engine speed limit; and a maximum motor speed limit controller configured to control limiting of the maximum motor speed.

The maximum engine speed limit controller may include: a maximum engine speed limit control entry determining unit configured to start controlling a maximum engine speed limit when the speed of the engine exceeds the predetermined maximum engine speed; a maximum engine speed limit torque control outputting unit configured to feed-forwardly control the engine based on the predetermined engine torque profile to converge torque of the engine to 0 (zero); a maximum engine speed limit control release determining unit configured to release a zero torque command of the maximum engine speed limit torque control outputting unit when the speed of the engine is under a predetermined engine releasing speed; and a maximum engine speed limit release torque control outputting unit configured to increase the torque of the engine by feed-forward controlling based on the predetermined engine torque profile when the zero torque command of the maximum engine speed limit control release determining unit is released, wherein the engine torque profile comprises predetermined data for feed-forwardly controlling the maximum engine speed limit torque control outputting unit and the maximum engine speed limit release torque control outputting unit.

The maximum motor speed limit controller may include: a maximum motor speed limit control entry unit configured to start controlling a maximum motor speed limit when the speed of the motor exceeds the predetermined maximum motor speed; a maximum motor speed limit torque control outputting unit configured to feed-forwardly control the motor based on the predetermined motor torque profile to converge torque of the motor to 0 (zero); a maximum motor speed limit control release determining unit configured to release a zero torque command of the maximum motor speed limit torque control outputting unit when the speed of the motor is under a predetermined motor releasing speed; and a maximum motor speed limit release torque control outputting unit configured to increase torque of the motor by feed-forward controlling based on the predetermined motor torque profile when the zero torque command of the maximum motor speed limit control release determining unit is released, wherein the motor torque profile comprises predetermined data for feed-forwardly controlling the maximum motor speed limit torque control outputting unit and the maximum motor speed limit release torque control outputting unit.

As described above, according to the exemplary embodiment of the present inventive concept, it may be possible to limit a maximum speed of the engine and the motor by feed-forwardly controlling the engine and the motor based on a concept of a torque profile irrespective of speed and torque of an engine and a motor, thereby having advantages as follows.

It may be possible to protect against unwanted continuous judder or shock and enhance drivability by stably limiting output torque of an engine and a motor regardless of variation of an input speed of a transmission.

It may be possible to stably protect components, devices, and systems associated with an engine, a motor, and a transmission by limiting the maximum input speed of a transmission. It may be possible to protect over-discharging of a battery and increase fuel efficiency by consistently maintaining values to limit maximum torque of an engine and a motor.

It may be possible to protect against shift-shock and solve shift-delay by applying stable torque control.

DETAILED DESCRIPTION OF THE EMBODIMENTS

Figure 1:
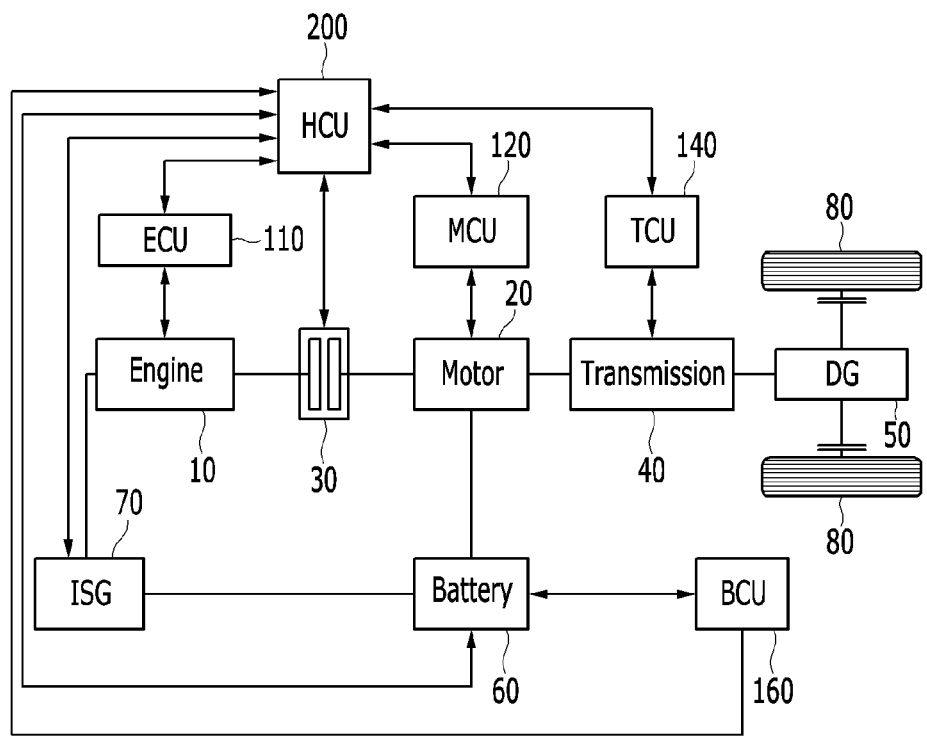
FIG. 1 an exemplary block diagram illustrating a configuration of a typical hybrid vehicle.
Figure 2:
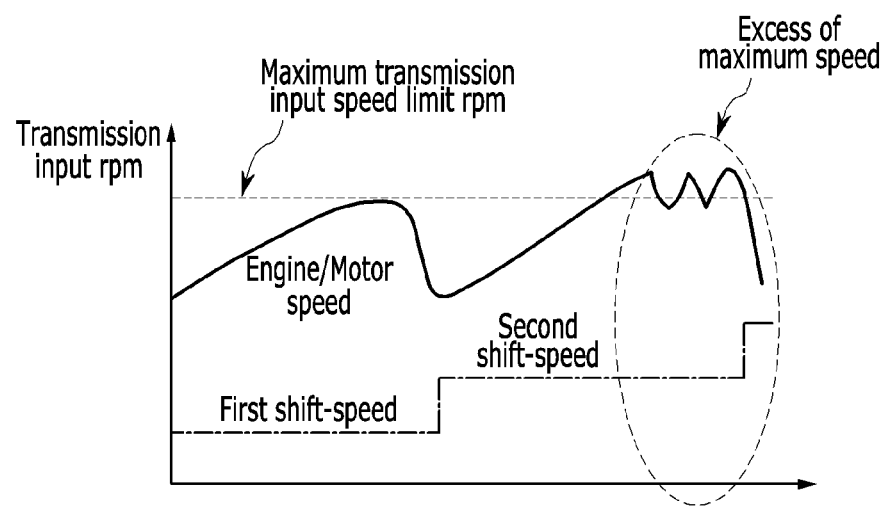
FIG. 2 and FIG. 3 are exemplary graphs for explaining problems of control methods of limiting a maximum speed of an engine and a motor of a hybrid vehicle according to the related art.
Figure 3:
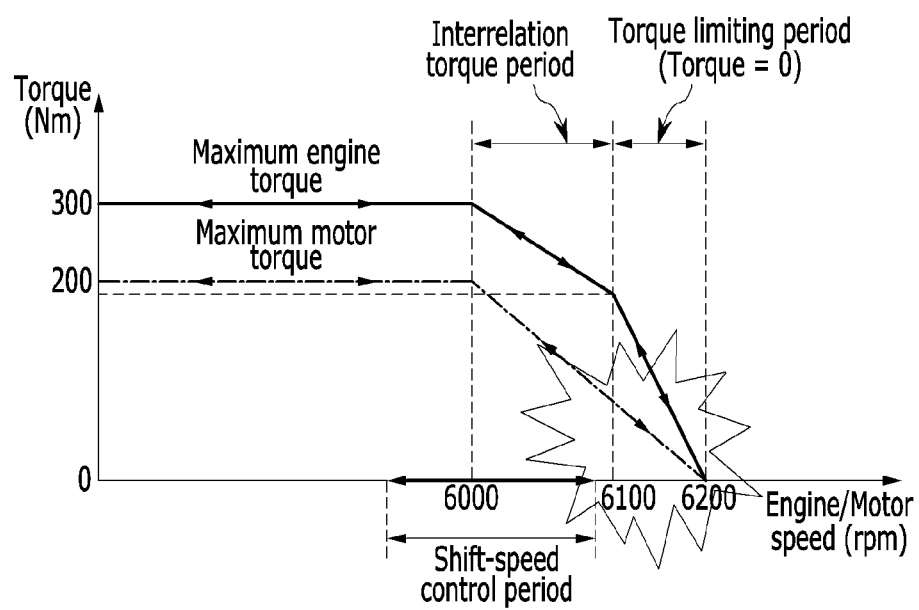

Hereinafter, an exemplary embodiment of the present disclosure will be described more fully with reference to the accompanying drawings. As those skilled in the art would realize, the described embodiments may be modified in various different ways, all without departing from the spirit or scope of the present disclosure.

Further, throughout the specification, like reference numerals refer to like elements.

Throughout the specification, unless explicitly described to the contrary, the word "comprise" and variations such as "comprises" or "comprising" will be understood to imply the inclusion of stated elements but not the exclusion of any other elements.

FIG. 1 is an exemplary diagram schematically illustrating a hybrid vehicle to which a control system for limiting the maximum speed of an engine and a motor according to an exemplary embodiment of the present inventive concept may be applied.

As shown in FIG. 1, the hybrid vehicle to which a control system for limiting the maximum speed of an engine and a motor according to an exemplary embodiment of the present inventive concept applied may include: an engine 10; a motor 20; an engine clutch 30 configured to control power transmission between the engine 10 and the motor 20; a transmission 40; a differential gear 50; a battery 60; an integrated starter-generator 70 configured to start the engine 10 or to generate electric power by output of the engine 10; and wheels 80.

The hybrid vehicle may also include: a hybrid control unit (HCU) 200 configured to control overall operation of the hybrid electric vehicle; an engine control unit (ECU) 110 configured to control operation of the engine 10; a motor control unit (MCU) 120 configured to control operation of the motor 20; a transmission control unit (TCU) 140 configured to control an operation of the transmission 40; and a battery control unit (BCU) 160 configured to manage and control the battery 60.

Figure 4:
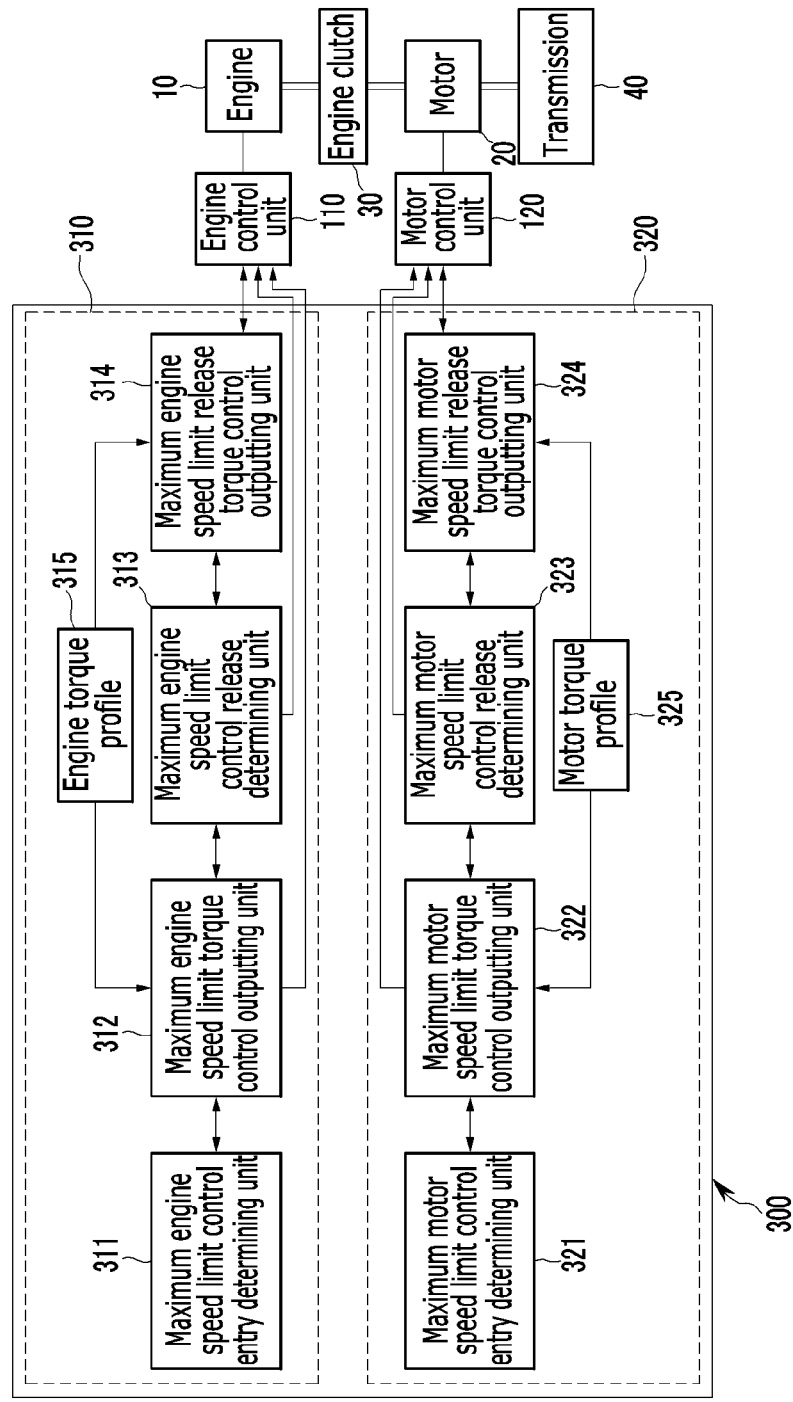
FIG. 4 is an exemplary configuration diagram of a control system for limiting the maximum speed of an engine and a motor of a hybrid vehicle according to an exemplary embodiment of the present inventive concept.

FIG. 4 is an exemplary configuration diagram of a control system for limiting the maximum speed of an engine and a motor of a hybrid vehicle according to an exemplary embodiment of the present inventive concept.

The control system that limits the maximum speed of an engine and a motor of a hybrid vehicle according to an exemplary embodiment of the present inventive concept may be a system limiting the maximum speed of an engine and a motor by feed-forwardly controlling the engine and the motor based on a concept of torque profile irrespective of speed and torque of an engine and a motor.

The control system that limits the maximum speed of the engine and the motor of the hybrid vehicle may include: an engine clutch 30 configured to control power transmission between an engine 10 and a motor 20; a transmission 40 configured to be connected to the motor 20; an engine control unit 110 configured to control operation of the engine 10; a motor control unit 120 configured to control operation of the motor 20; and a maximum speed limit controller 300 configured to control limiting of the maximum speed of the engine 10 and the motor 20.

Since the engine 10, the motor 20, the engine clutch 30, the transmission 40, the ECU 110, and the MCU 120 are generally installed in typical hybrid vehicles, their detailed description will be omitted in the present specification.

The maximum speed limit controller 300 may include a maximum engine speed limit controller 310 configured to control a maximum engine speed limit, and a maximum motor speed limit controller 320 configured to control a maximum motor speed limit.

The maximum engine speed limit controller 310 may include: a maximum engine speed limit control entry determining unit 311 configured to start to control limiting of a maximum engine speed when the speed of the engine 10 exceeds the predetermined maximum engine speed (e.g., 6150 rpm); a maximum engine speed limit torque control outputting unit 312 configured to feed-forwardly control the engine 10 based on the predetermined engine torque profile to converge torque of the engine 10 to 0 (zero); a maximum engine speed limit control release determining unit 313 configured to release a zero torque command of the maximum engine speed limit torque control outputting unit 312 when speed of the engine 20 is under a predetermined engine releasing speed (e.g., 5900 rpm); a maximum engine speed limit release torque control outputting unit 314 configured to increase torque of the engine 10 by feed-forward controlling based on the predetermined engine torque profile when the zero torque command of the maximum engine speed limit control release determining unit 313 is released; and an engine torque profile 315 that comprises predetermined data for feed-forwardly controlling of the maximum engine speed limit torque control outputting unit 312 and the maximum engine speed limit release torque control outputting unit 314.

The maximum motor speed limit controller 320 may include: a maximum motor speed limit control entry unit 321 configured to start controlling a maximum motor speed limit when the speed of the motor 20 exceeds the predetermined maximum motor speed (e.g., 6150 rpm); a maximum motor speed limit torque control outputting unit 322 configured to feed-forwardly control the motor 20 based on the predetermined motor torque profile to converge torque of the motor 20 to 0 (zero); a maximum motor speed limit control release determining unit 323 configured to release a zero torque command of the maximum motor speed limit torque control outputting unit 322 when the speed of the motor is under a predetermined motor releasing speed (e.g., 6050 rpm); a maximum motor speed limit release torque control outputting unit 324 configured to increase torque of the motor 20 by feed-forward controlling based on the predetermined motor torque profile when the zero torque command of the maximum motor speed limit control release determining unit 323 is released; and a motor torque profile 325 that comprises predetermined data for feed-forwardly controlling of the maximum motor speed limit torque controller 322 and the maximum motor speed limit release torque control outputting unit 324.

The maximum speed limit controller 300, the maximum engine speed limit controller 310, and the maximum motor speed limit controller 320 may include one or more microprocessors or/and hardware operated by program instructions executed thereon. The program instructions may include a series of commands that perform a control method of limiting the maximum speed of an engine and a motor of a hybrid vehicle according to an exemplary embodiment of the present inventive concept, which will be described below.

In other words, the maximum speed limit controller 300, the maximum engine speed limit controller 310, and the maximum motor speed limit controller 320 may be formed in a module in which a program and hardware are combined. For example, the maximum speed limit controller 300, the maximum engine speed limit controller 310, and the maximum motor speed limit controller 320 may be formed on a PCB (printed circuit board) that mounts a microprocessor, electric and electronic components, and a memory device (ROM, RAM) in which a control method of an exemplary embodiment of the present inventive concept is stored as a program.

The maximum speed limit controller 300 may be included in a hybrid control unit (HCU) that controls general operation of a hybrid vehicle.

Hereinafter, a control method of limiting the maximum speed of an engine and a motor of a hybrid vehicle according to an exemplary embodiment of the present inventive concept will be described in detail with reference to the accompanying drawings.

Figure 5:
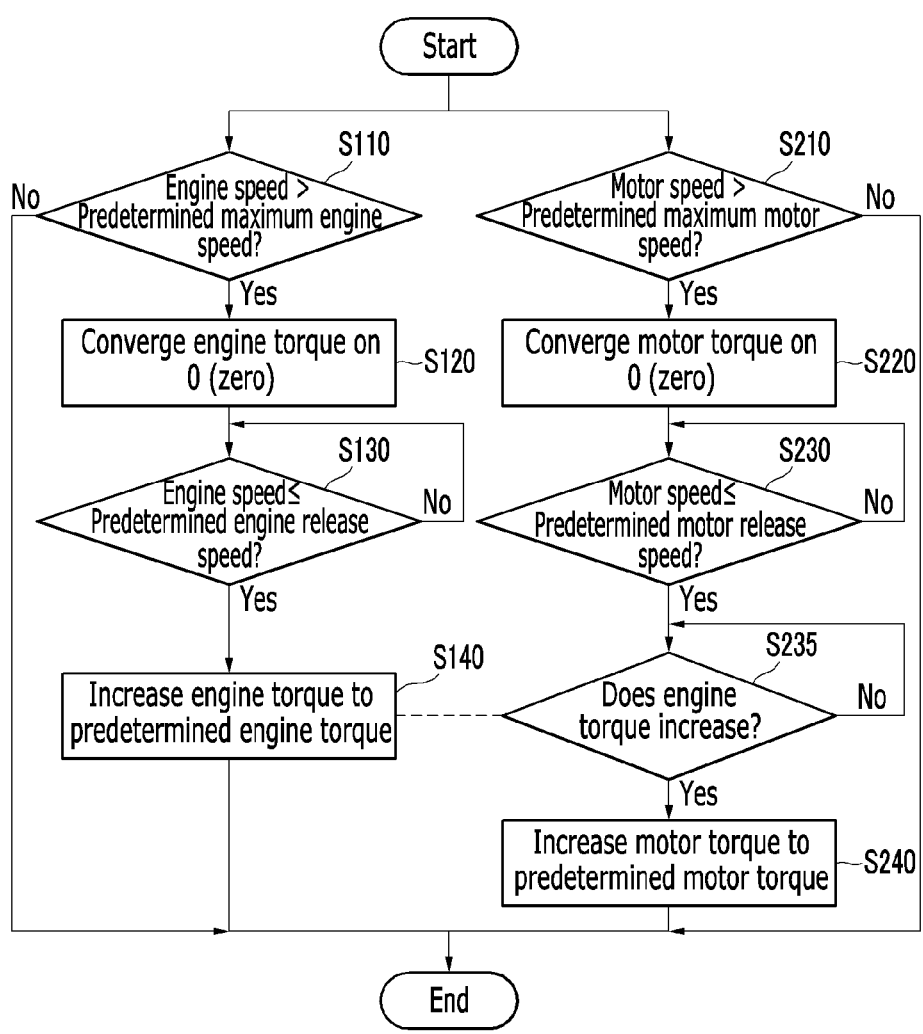
FIG. 5 is an exemplary flowchart of a control method of limiting the maximum speed of an engine and a motor of a hybrid vehicle according to an exemplary embodiment of the present inventive concept.

FIG. 5 is an exemplary flowchart of a control method of limiting the maximum speed of an engine and a motor of a hybrid vehicle according to an exemplary embodiment of the present inventive concept.

As shown in FIG. 5, the maximum speed limit controller 300 controls the maximum engine speed limit of the engine 10 and controls the maximum motor speed limit of the motor 20 in parallel.

Therefore, in the specification, controlling the maximum engine speed limit of the engine 10 will be firstly described, and then the maximum motor speed limit of the motor 20 will be described.

The maximum engine speed limit control entry determining unit 311 of the maximum speed limit controller 300 determines whether the speed of the engine 10 exceeds a predetermined maximum engine speed (e.g., V1 shown in FIG. 6) at step S110. For example, the predetermined maximum engine speed (V1) may be 6150 rpm.

Figure 6:
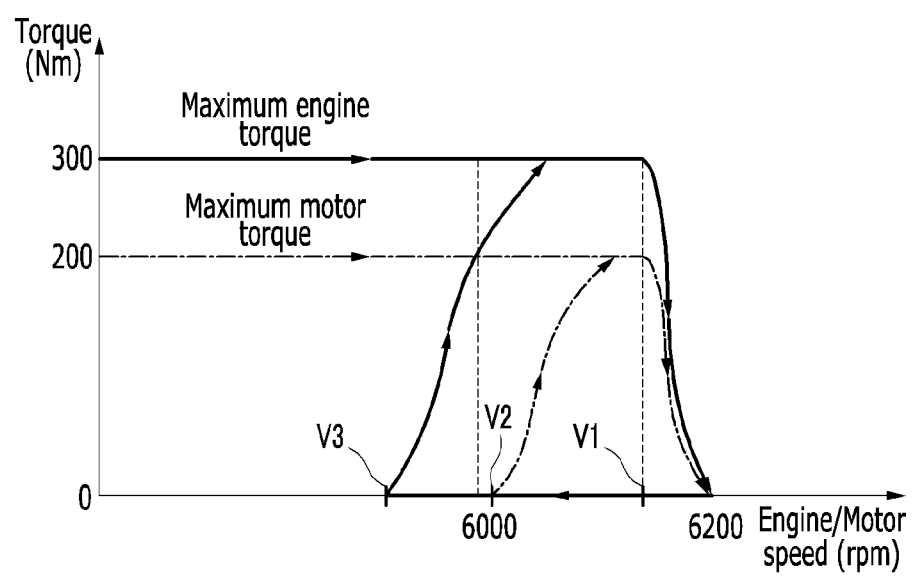
FIG. 6 is an exemplary graph for explaining operations of exemplary embodiments of the present inventive concept.

When the speed of the engine 10 exceeds the predetermined maximum engine speed at step S110, the maximum engine speed limit torque control outputting unit 312 of the maximum speed limit controller 300 feed-forwardly controls the engine 10 based on the engine torque profile 315 in order to gradually converge torque of the engine 10 to 0 (zero) as shown in FIG. 6, at step 120.

The maximum engine speed limit torque control outputting unit 312 may control the engine 10 using the engine control unit 110.

The engine torque profile 315 is a profile in which torque values of the engine 10 according to the speed of the engine 10 is predetermined. The predetermined torque values of the engine 10 may be obtained through simulations and/or experiment.

While the torque of the engine 10 converges to 0 (zero) torque at step S120, the maximum engine speed limit control release determining unit 313 of the maximum speed limit controller 300 determines whether the speed of the engine 10 is under a predetermined releasing engine speed (e.g., V3 shown in FIG. 6) at step 130, for example, the predetermined releasing engine speed (V3) may be 5900 rpm.

When the speed of the engine 10 is under the predetermined releasing engine speed (V3) at step S130, the maximum engine speed limit release torque control outputting unit 314 of the maximum speed limit controller 300 feed-forwardly controls the engine 10 based on the predetermined engine torque profile to increase the torque of the engine 10 at step S140.

The maximum engine speed limit release torque control outputting unit 314 may control the engine 10 using the engine control unit 110.

The maximum engine speed limit release torque control outputting unit 314 may increase the torque of the engine 10 to a maximum engine torque as shown in FIG. 6. The maximum engine torque shown in FIG. 6 may be 300 N·m.

Referring to FIG. 6, the maximum engine speed limit controller 310 may perform the control for limiting the maximum engine speed using hysteresis.

In the meantime, the maximum motor speed limit control entry determining unit 321 of the maximum speed limit controller 300 determines whether speed of the motor 20 exceeds a predetermined maximum motor speed (e.g., V1 shown in FIG. 6) at step S210. For example, the predetermined maximum motor speed (V1) may be 6150 rpm.

The predetermined maximum motor speed may be equal to the predetermined maximum engine speed described above.

When the speed of the motor 20 exceeds the predetermined maximum motor speed at step S210, the maximum motor speed limit torque control outputting unit 322 of the maximum speed limit controller 300 feed-forwardly controls the motor 20 based on the motor torque profile 325 in order to gradually converge torque of the motor 20 to 0 (zero) as shown in FIG. 6, at step 220.

The maximum motor speed limit torque control outputting unit 322 may control the motor 20 using the motor control unit 120.

The motor torque profile 325 is a profile in which torque values of the motor 20 according to speed of the motor 20 are predetermined. The predetermined torque values of the motor 20 may be obtained through simulations and/or experiment.

While the torque of the motor 20 converges to 0 (zero) torque at step S220, the maximum motor speed limit control release determining unit 323 of the maximum speed limit controller 300 determines whether the speed of the motor 20 is under a predetermined releasing motor speed (e.g., V2 shown in FIG. 6) at step 230.

For example, the predetermined releasing motor speed (V2) may be 6050 rpm. Referring to FIG. 6, the predetermined releasing motor speed (V2) is different from the predetermined releasing engine speed (V3).

When the speed of the motor 20 is under the predetermined releasing engine speed (V2) at step S230, the maximum motor speed limit release torque control outputting unit 324 of the maximum speed limit controller 300 determines whether the torque of the engine 10 starts to increase at step 140, and at step 235.

When the torque of the engine 10 starts to increase at step 140, the maximum motor speed limit release torque control outputting unit 324 of the maximum speed limit controller 300 feed-forwardly controls the motor 20 based on the motor torque profile 325 to increase the torque of the motor 20 at step S240.

The maximum motor speed limit release torque control outputting unit 324 may control the motor 20 using the MCU 120.

The maximum motor speed limit release torque control outputting unit 324 may increase the torque of the motor 20 to a maximum motor torque as shown in FIG. 6. The maximum motor torque shown in FIG. 6 may be 200 N·m.

The reason for increasing the torque of the motor 20 after the torque of the engine 10 starts to increase is because if the motor 20 is firstly operated, the motor 20 must deal with the torque of the engine as well in order to prevent an state of charge (SOC) of a battery from deteriorating.

Referring to FIG. 6, the maximum motor speed limit controller 320 may control the maximum motor speed limit by using hysteresis.

Accordingly, the control method for limiting the maximum speed of the engine and the motor of the hybrid vehicle and the control system thereof may stably limit the maximum speed of the engine and the motor by feed-forwardly controlling the engine and the motor based on a concept of the torque profile irrespective of the speed and torque of the engine and the motor.

While this inventive concept has been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A control method of limiting maximum speeds of an engine and a motor of a hybrid vehicle, wherein the hybrid vehicle includes an engine clutch configured to control power transmission between the engine and the motor, and a transmission connected to the motor, the control method comprising:
    determining, by a controller, whether a speed of the engine exceeds a predetermined maximum engine speed;
    determining, by the controller, whether a speed of the motor exceeds a predetermined maximum motor speed;
    limiting, by the controller, the speed of the engine based on a predetermined engine torque profile when the speed of the engine exceeds the predetermined maximum engine speed; and
    limiting, by the controller, the speed of the motor based on a predetermined motor torque profile when the speed of the engine exceeds the predetermined maximum engine speed,
    wherein the step of limiting the speed of the engine includes:
        controlling, by the controller, the engine based on the predetermined engine torque profile to converge a torque of the engine to 0 (zero) when the speed of the engine exceeds the predetermined maximum engine speed;
        determining, by the controller, whether the speed of the engine is under a predetermined releasing engine speed while the torque of the engine converges to 0; and
        increasing, by the controller, the torque of the engine when the speed of the engine is under the predetermined releasing engine speed.

2. The control method of claim 1, wherein the step of increasing the torque of the engine includes:
    increasing, by the controller, the torque of the engine to a torque of the engine corresponding to a point in time when the speed of the engine exceeds the predetermined maximum engine speed based on the predetermined engine torque profile.

3. The control method of claim 1, wherein the predetermined maximum engine speed is equal to the predetermined maximum motor speed.

4. The control method of claim 3, wherein the step of limiting the speed of the motor includes:
    controlling, by the controller, the motor based on the predetermined motor torque profile to converge a torque of the motor on 0 (zero) when the speed of the motor exceeds the predetermined maximum motor speed;
    determining, by the controller, whether the speed of the motor is under a predetermined releasing motor speed while the torque of the motor converges on 0; and
    increasing, by the controller, the torque of the motor when the speed of the motor is under the predetermined releasing motor speed.

5. The control method of claim 4, wherein the step of increasing the torque of the motor includes:
    increasing, by the controller, the torque of the motor to a torque of the motor corresponding to a point in time when the speed of the motor exceeds the predetermined maximum motor speed based on the predetermined motor torque profile.

6. The control method of claim 4, wherein the predetermined releasing engine speed is different from the predetermined releasing motor speed.

7. The control method of claim 4, wherein the step of increasing the torque of the motor, by the controller, is performed after the step of increasing the torque of the engine.

8. A control system for limiting maximum speeds of an engine and a motor of a hybrid vehicle, the system comprising:

an engine clutch configured to control power transmission between the engine and the motor;

a transmission configured to be connected to the motor;

an engine control unit configured to control operation of the engine;

a motor control unit configured to control operation of the motor; and a maximum speed limit controller configured to control limiting of the maximum speeds of the engine and the motor;

wherein the maximum speed limit controller is configured to control by:

determining whether a speed of the engine exceeds a predetermined maximum engine speed;

determining whether a speed of the motor exceeds a predetermined maximum motor speed;

limiting the speed of the engine based on a predetermined engine torque profile when the speed of the engine exceeds the predetermined maximum engine speed; and limiting the speed of the motor based on a predetermined motor torque profile when the speed of the engine exceeds the predetermined maximum engine speed, wherein the maximum speed limit controller includes a maximum engine speed limit controller configured to control limiting of the maximum engine seed and a maximum motor speed limit controller configured to control limiting of the maximum motor speed, and wherein the maximum engine speed limit controller includes:

a maximum engine speed limit control entry determining unit configured to start to control limiting of the maximum engine speed when the speed of the engine exceeds the predetermined maximum engine speed;

a maximum engine speed limit torque control outputting unit configured to feed-forwardly control the engine based on the predetermined engine torque profile to converge a torque of the engine on 0 (zero);

a maximum engine speed limit control release determining unit configured to release a zero torque command of the maximum engine speed limit torque control outputting unit when the speed of the engine is under a predetermined engine releasing speed;

a maximum engine speed limit release torque control outputting unit configured to increase the torque of the engine by feed-forward controlling based on the predetermined engine torque profile when the zero torque command of the maximum engine speed limit control release determining unit is released; and an engine torque profile that consists of predetermined data for feed-forwardly controlling the maximum engine speed limit torque control outputting unit and the maximum engine speed limit release the torque control outputting unit.

9. A control system for limiting maximum speeds of an engine and a motor of a hybrid vehicle, the system comprising:

an engine clutch configured to control power transmission between the engine and the motor;

a transmission configured to be connected to the motor;

an engine control unit configured to control operation of the engine;

a motor control unit configured to control operation of the motor; and a maximum speed limit controller configured to control limiting of the maximum speed of the engine and the motor;

wherein the maximum speed limit controller is configured to control by:

determining whether a speed of the engine exceeds a predetermined maximum engine speed;

determining whether a speed of the motor exceeds a predetermined maximum motor speed;

limiting the speed of the engine based on a predetermined engine torque profile when the speed of the engine exceeds the predetermined maximum engine speed; and limiting the speed of the motor based on a predetermined motor torque profile when the speed of the engine exceeds the predetermined maximum engine speed, wherein the maximum speed limit controller includes a maximum engine speed limit controller configured to control limiting of the maximum engine speed and a maximum motor speed limit controller configured to control limiting of the maximum motor speed, and wherein the maximum motor speed limit controller includes:

a maximum motor speed limit control entry unit configured to start to control limiting of the maximum motor speed when the speed of the motor exceeds the predetermined maximum motor speed;

a maximum motor speed limit torque control outputting unit configured to feed-forwardly control the motor based on the predetermined motor torque profile to converge a torque of the motor on 0 (zero);

a maximum motor speed limit control release determining unit configured to release a zero torque command of the maximum motor speed limit torque control outputting unit when the speed of the motor is under a predetermined motor releasing speed;

a maximum motor speed limit release torque control outputting unit configured to increase the torque of the motor by feed-forward controlling based on the predetermined motor torque profile when the zero torque command of the maximum motor speed limit control release determining unit is released; and a motor torque profile that consists of predetermined data for feed-forwardly controlling the maximum motor speed limit torque control outputting unit and the maximum motor speed limit release torque control outputting unit.

\* \* \* \* \*